(12) United States Patent
Ohata et al.

(10) Patent No.: US 10,964,994 B2
(45) Date of Patent: Mar. 30, 2021

(54) NONRECIPROCAL CIRCUIT ELEMENT AND COMMUNICATION APPARATUS USING THE SAME

(71) Applicant: TDK Corporation, Tokyo (JP)

(72) Inventors: Hidenori Ohata, Tokyo (JP); Yoshinori Matsumaru, Tokyo (JP); Junichi Nakamura, Tokyo (JP)

(73) Assignee: TDK CORPORATION, Tokyo (JP)

(*) Notice: Subject to any disclaimer, the term of this patent is extended or adjusted under 35 U.S.C. 154(b) by 22 days.

(21) Appl. No.: 16/436,148

(22) Filed: Jun. 10, 2019

(65) Prior Publication Data

US 2019/0386369 A1    Dec. 19, 2019

(30) Foreign Application Priority Data

Jun. 13, 2018   (JP) .............................. JP2018-112935

(51) Int. Cl.
| | |
|---|---|
| *H01P 1/387* | (2006.01) |
| *H01P 1/393* | (2006.01) |
| *H01P 1/375* | (2006.01) |
| *H04B 1/40* | (2015.01) |

(52) U.S. Cl.
CPC .............. *H01P 1/393* (2013.01); *H01P 1/375* (2013.01); *H01P 1/387* (2013.01); *H04B 1/40* (2013.01)

(58) Field of Classification Search
CPC .... H01P 1/38; H01P 1/36; H01P 1/383; H01P 1/387

USPC .................................................. 333/1.1, 24.2
See application file for complete search history.

(56) References Cited

U.S. PATENT DOCUMENTS

| | | | |
|---|---|---|---|
| 6,844,789 B2* | 1/2005 | Lombardi | H01P 1/387 |
| | | | 333/1.1 |
| 2013/0321090 A1 | 12/2013 | Cruickshank et al. | |
| 2018/0138572 A1 | 5/2018 | Ohata et al. | |

FOREIGN PATENT DOCUMENTS

| | | |
|---|---|---|
| JP | 2007-288701 A | 11/2007 |
| JP | 6231555 B2 | 11/2017 |

OTHER PUBLICATIONS

Yang et al., The magnetic and dielectric properties of microwave sintered yttrium iron garnet (YIG), Jun. 2008, Science Direct, vol. 62, issues 17-18, Abstract. (Year: 2008).*
Japanese Notice of Reasons for Refusal issued in corresponding Japanese Patent Application No. 2018-112935, dated Apr. 7, 2020, with English translation.

* cited by examiner

*Primary Examiner* — Stephen E. Jones
(74) *Attorney, Agent, or Firm* — McDermott Will & Emery LLP (57) ABSTRACT

Disclosed herein is a nonreciprocal circuit element that includes a magnetic rotator, and a permanent magnet that applies a DC magnetic field to the magnetic rotator. The magnetic rotator includes a center conductor, a first ferrite core laminated on the center conductor, and a dielectric provided in a gap formed between the center conductor and the first ferrite core.

14 Claims, 8 Drawing Sheets

NONRECIPROCAL CIRCUIT ELEMENT AND COMMUNICATION APPARATUS USING THE SAME

BACKGROUND OF THE INVENTION

Field of the Invention

The present invention relates to a nonreciprocal circuit element and a communication apparatus using the nonreciprocal circuit element and, more particularly, to an nonreciprocal circuit element such as an isolator or a circulator suitably used in microwave or millimeter-wave frequency bands and a communication apparatus using such a nonreciprocal circuit element.

Description of Related Art

A nonreciprocal circuit element such as an isolator or a circulator is incorporated in, e.g., a mobile communication device like a mobile phone or a communication apparatus used in a base station. As described in Japanese Patent No. 6,231,555, a general nonreciprocal circuit element is constituted of a magnetic rotator having a center conductor and a pair of ferrite cores sandwiching the center conductor and a permanent magnet applying a magnetic field to the magnetic rotator.

However, in conventional nonreciprocal circuit elements, when an unevenness or distortion is present in a center conductor, a grounding conductor, a ferrite core, or the like, an air layer may exist between the center conductor and the ferrite core, or between the grounding conductor and ferrite core. The presence of such an air layer reduces an effective dielectric constant between the center conductor and the grounding conductor, which poses a problem in that the operation frequency of the nonreciprocal circuit element becomes higher than a designed value.

That is, in an ideal nonreciprocal circuit element, a radius a of the ferrite core is determined by the following expression (1).

$$a = X_a(\theta) \frac{\lambda_0}{2\pi\sqrt{\varepsilon_r \mu_{\mathit{eff},r}}} \quad (1)$$

In the above expression, $X_a(\theta)$ is a constant obtained from a contact angle $\theta$, $\lambda_0$ is the free-space wavelength of a use frequency, $\varepsilon_r$ is the specific dielectric constant of the ferrite core, and $\mu_{\mathit{eff},r}$ is an effective permeability. Assuming that the propagation speed of electric wave is v, a use frequency $F_0$ can be represented by $F_0 = v/\lambda_0$, so that the expression (1) can be modified into the following expression (1)'.

$$a = X_a(\theta) \frac{v}{2\pi F_0 \sqrt{\varepsilon_r \mu_{\mathit{eff},r}}} \quad (1)'$$

When the expression (1)' is solved for $F_0$, the following expression (2) can be obtained.

$$F_0 = X_a(\theta) \frac{v}{2\pi a \sqrt{\varepsilon_r \mu_{\mathit{eff},r}}} \quad (2)$$

As is clear from the expression (1)', when the $F_0$ is constant, a reduction in the effective dielectric constant due to intrusion of the air layer increases the radius a of the ferrite core. On the other hand, as is clear from the expression (2), when the radius a of the ferrite core is constant, a reduction in the effective dielectric constant increases the operation frequency.

SUMMARY

It is therefore an object of the present invention to provide a nonreciprocal circuit element capable of suppressing a change in electric characteristics attributable to the presence of an air layer caused due to unevenness or distortion in the center conductor, grounding conductor, ferrite core, or the like and a communication apparatus using the nonreciprocal circuit element.

A nonreciprocal circuit element according to the present invention includes a magnetic rotator and a permanent magnet that applies a DC magnetic field to the magnetic rotator. The magnetic rotator includes a center conductor, a first ferrite core laminated on the center conductor, and a dielectric provided in a gap formed between the center conductor and the first ferrite core.

Further, a communication apparatus according to the present invention includes the above nonreciprocal circuit element.

According to the present invention, the dielectric is filled in an air layer between the center conductor and the first ferrite core, making it possible to prevent a reduction in effective dielectric constant. This can suppress a change in electrical characteristics attributable to the presence of the air layer caused due to unevenness or distortion in the center conductor or ferrite core.

In the present invention, the dielectric constant of the dielectric is preferably as close to the dielectric constant of the first core as possible. From this point of view, the dielectric constant of the dielectric is preferably 0.5 times or more the dielectric constant of the first ferrite core. When it is difficult to completely fill the air layer with the dielectric, the dielectric constant of the dielectric is preferably equal to or higher than the dielectric constant of the first ferrite core.

In the present invention, the dielectric may cover the side surface of the center conductor. This can further enhance an effective dielectric constant.

In the present invention, the magnetic rotator may further include a second ferrite core, the center conductor is sandwiched between the first and second ferrite cores, and the dielectric may be provided in a gap formed between the center conductor and the second ferrite core such that the center conductor and the dielectric are sandwiched between the first and second ferrite cores. This can further enhance the characteristics of the magnetic rotator.

In the present invention, the lower surface of the center conductor may have a portion that contacts the first ferrite core and a portion that does not contact the same, the upper surface of the center conductor may have a portion that contacts the second ferrite core and a portion that does not contact the same, and the dielectric may be interposed between the portion of the lower surface of the center conductor that does not contact the first ferrite core and the first ferrite core and between the portion of the upper surface of the center conductor that does not contact the second ferrite core and the second ferrite core. This can suppress a reduction in effective dielectric constant due to a distortion or the like of the center conductor.

In the present invention, the center conductor may have a large thickness portion and a small thickness portion, the large thickness portion may contact the second ferrite core, and the dielectric may be interposed between the small thickness portion and the second ferrite core. This can suppress a reduction in effective dielectric constant due to thickness unevenness of the center conductor.

In the present invention, the lower surface or upper surface of the center conductor may be entirely covered with the dielectric without contacting the first or second ferrite core. Even in this case, the air layer is not generated between the center conductor and the first or second ferrite core, making it possible to suppress a reduction in effective dielectric constant.

The nonreciprocal circuit element according to the present invention may further include a grounding conductor which is disposed on the back surface of the first ferrite core positioned on the side opposite to the front surface of the first ferrite core on which the center conductor is disposed, and the dielectric may further be provided in a gap formed between the first ferrite core and the grounding conductor. With this configuration, the dielectric is filled in the air layer between the grounding conductor and the first ferrite core, making it possible to suppress a reduction in effective dielectric constant.

In the present invention, the dielectric loss tangent (tan δ) of the dielectric may be equal to or smaller than 0.01. This can sufficiently reduce an insertion loss.

As described above, according to the present invention, it is possible to suppress a change in electric characteristics attributable to the presence of the air layer caused due to unevenness or distortion, grounding conductor, ferrite core, or the like.

BRIEF DESCRIPTION OF THE DRAWINGS

The above features and advantages of the present invention will be more apparent from the following description of certain preferred embodiments taken in conjunction with the accompanying drawings, in which:

FIGS. 3A to 3D are partial cross-sectional views of a magnetic rotator, where FIG. 3A illustrates an ideal state where unevenness or distortion is absent in the center conductor and a case where the center conductor and the ferrite cores closely adhere to each other, FIG. 3B illustrates an ideal state where unevenness or distortion is absent in the center conductor and a case where the dielectric is interposed between the center conductor and the ferrite cores, FIG. 3C illustrates a case where a distortion is present in the center conductor, and FIG. 3D illustrates a case where an edge part of the center conductor is smaller in thickness than the remaining part;

DETAILED DESCRIPTION OF THE EMBODIMENTS

Preferred embodiments of the present invention will be explained below in detail with reference to the accompanying drawings.

Figure 1:
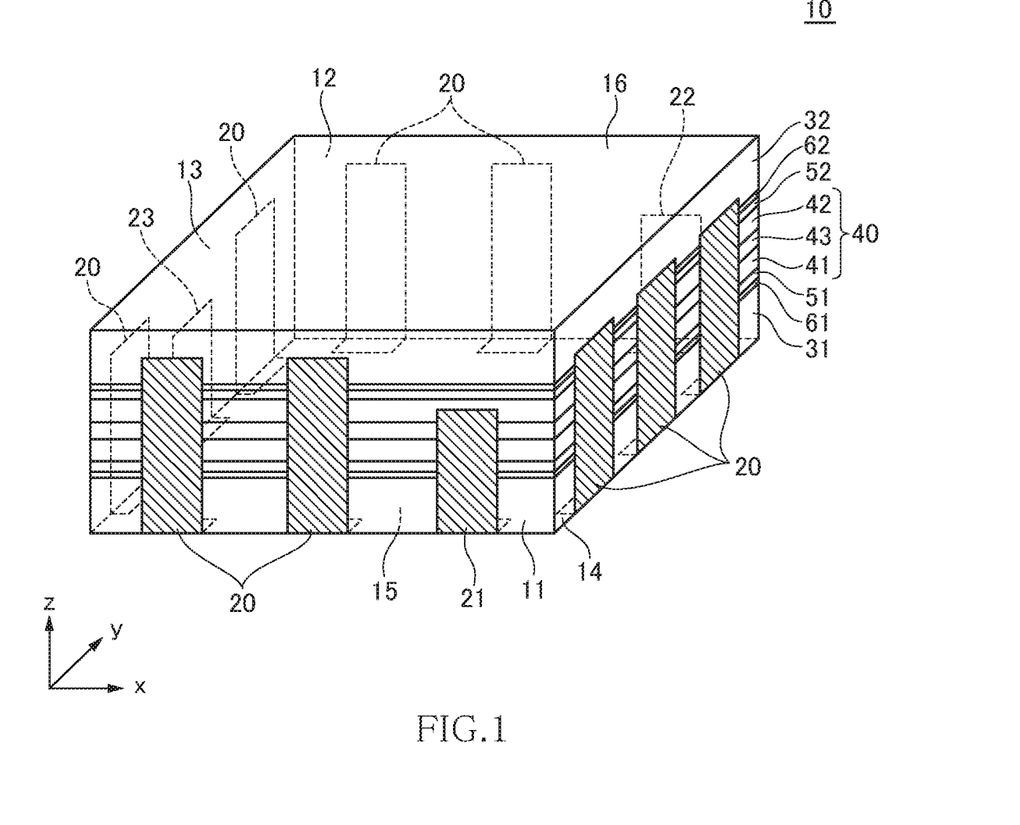
FIG. 1 is a schematic perspective view illustrating the configuration of a nonreciprocal circuit element according to a preferred embodiment of the present invention.
Figure 2:
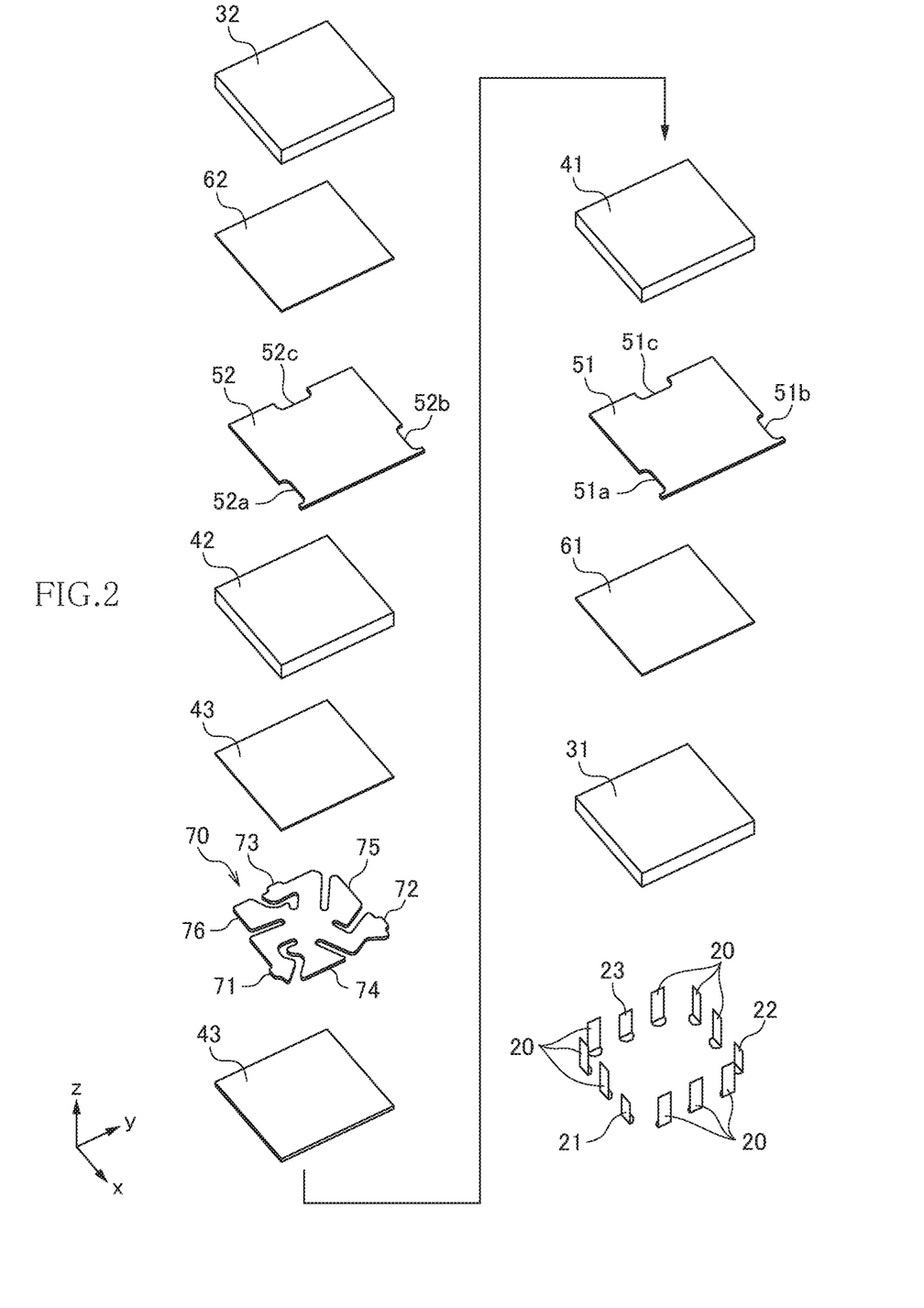
FIG. 2 is a schematic exploded perspective view of the nonreciprocal circuit element shown in FIG. 1.

FIG. 1 is a schematic perspective view illustrating the configuration of a nonreciprocal circuit element 10 according to a preferred embodiment of the present invention. FIG. 2 is a schematic exploded perspective view of the nonreciprocal circuit element 10.

The nonreciprocal circuit element 10 illustrated in FIGS. 1 and 2 is a distributed-constant-type nonreciprocal circuit element. The nonreciprocal circuit element 10 is incorporated in, e.g., a mobile communication device like a mobile phone or a communication apparatus used in a base station and used as an isolator or a circulator. Although not particularly limited, the nonreciprocal circuit element 10 according to the present embodiment is suitably used for a communication apparatus used in a base station.

As illustrated in FIGS. 1 and 2, the nonreciprocal circuit element 10 according to the present embodiment is a surface-mount-type chip component having a substantially rectangular parallelepiped shape and has first and second side surfaces 11 and 12 (xz plane), third and fourth side surfaces 13 and 14 (yz plane), and a mounting surface 15 (xy plane) and a top surface 16 (xy plane). The first side surface 11 is provided with a first external terminal 21, the second side surface 12 is provided with a second external terminal 22, and the third side surface 13 is provided with a third external terminal 23. Further, the first to fourth side surfaces 11 to 14 are each provided with a plurality of ground terminals 20. A portion of each of the external terminals 21 to 23 and ground terminals 20 is tucked under the mounting surface 15.

The three external terminals 21 to 23 are connected to their corresponding signal lines when the nonreciprocal circuit element 10 according to the present embodiment is used as a circulator. On the other hand, when the nonreciprocal circuit element 10 according to the present embodiment is used as an isolator, for example, the external terminals 21 and 22 are connected to their corresponding signal lines, and the external terminal 23 is grounded through a terminal resistor. Further, even when the external terminal 21 or 22 is grounded through a terminal resistor, the nonreciprocal circuit element 10 according to the present embodiment can be used as an isolator. A ground potential is given to the plurality of ground terminals 20 in common.

The nonreciprocal circuit element 10 further has permanent magnets 31 and 32 and a magnetic rotator 40 sandwiched between the permanent magnets 31 and 32 in the z-direction which is the lamination direction. The permanent magnets 31 and 32 apply a DC magnetic field to the magnetic rotator 40. In the present invention, one of the permanent magnets 31 and 32 may be omitted or replaced with an iron plate or the like as a magnetic substrate having small coercive force; however, to perpendicularly apply a strong magnetic field to the magnetic rotator 40, it is preferable to sandwich the magnetic rotator 40 by the two permanent magnets 31 and 32.

The magnetic rotator 40 includes two ferrite cores 41 and 42 and a center conductor 70 sandwiched between the ferrite cores 41 and 42 in the z-direction. As the material for the ferrite cores 41 and 42, a soft magnetic material such as yttrium/iron/garnet (YIG) is preferably used. The planar shape of the center conductor 70 is as illustrated in FIG. 2, and the center conductor 70 has three ports 71 to 73 radially led from the center point thereof and branch conductors 74 to 76 for adjusting electric characteristics. The center conductor 70 and ferrite cores 41 and 42 adhere to each other through a dielectric 43 having adhesiveness. Although there is no particular restriction on the material for the dielectric 43, a material having substantially the same dielectric constant as those of the ferrite cores 41 and 42 is preferably used.

The tip end of the first port 71 led from the center conductor 70 is exposed to the first side surface 11 and is thus connected to the first external terminal 21. The tip end of the second port 72 led from the center conductor 70 is exposed to the second side surface 12 and is thus connected to the second external terminal 22. The tip end of the third port 73 led from the center conductor 70 is exposed to the third side surface 13 and is thus connected to the third external terminal 23.

The nonreciprocal circuit element 10 according to the present embodiment further has a grounding conductor 51 sandwiched between the permanent magnet 31 and the magnetic rotator 40 in the z-direction and a grounding conductor 52 sandwiched between the permanent magnet 32 and the magnetic rotator 40 in the z-direction. Thus, the center conductor 70 is sandwiched between the two grounding conductors 51 and 52 and thus isolated from the permanent magnets 31 and 32. The grounding conductor 51 has cuts 51a to 51c formed at portions respectively overlapping the external terminals 21 to 23, and the grounding conductor 52 has cuts 52a to 52c formed at portions respectively overlapping the external terminals 21 to 23, thereby preventing the grounding conductors 51 and 52 from interfering with the external terminals 21 to 23. The remaining parts of each of the grounding conductors 51 and 52 are exposed from the first to fourth side surfaces 11 to 14. Thus, the plurality of ground terminals 20 are each connected to both the grounding conductors 51 and 52.

In the present embodiment, the grounding conductor 51 is printed on the lower surface of the ferrite core 41, and the grounding conductor 52 is printed on the upper surface of the ferrite core 42. Thus, the grounding conductor 51 and the ferrite core 41 closely adhere to each other with substantially no gap, and the grounding conductor 52 and the ferrite core 42 closely adhere to each other with substantially no gap. The permanent magnet 31 and the grounding conductor 51 adhere to each other through a dielectric 61 having adhesiveness, and the permanent magnet 32 and the grounding conductor 52 adhere to each other through a dielectric 62 having adhesiveness. The dielectrics 61 and 62 may be formed using the same material as the dielectric 43.

Figure 3A:
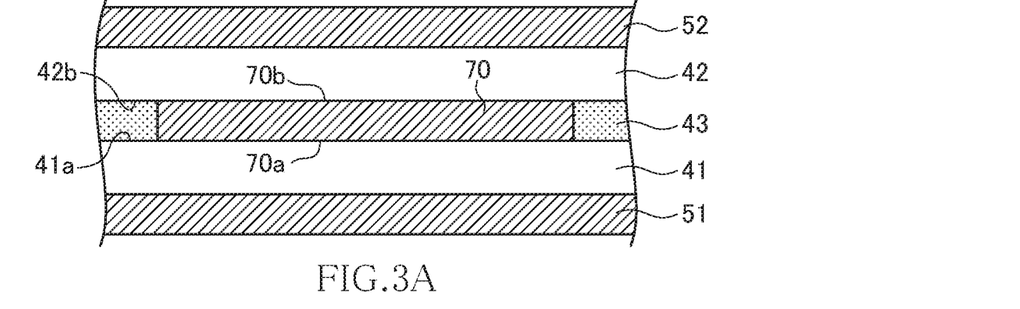
Figure 3B:
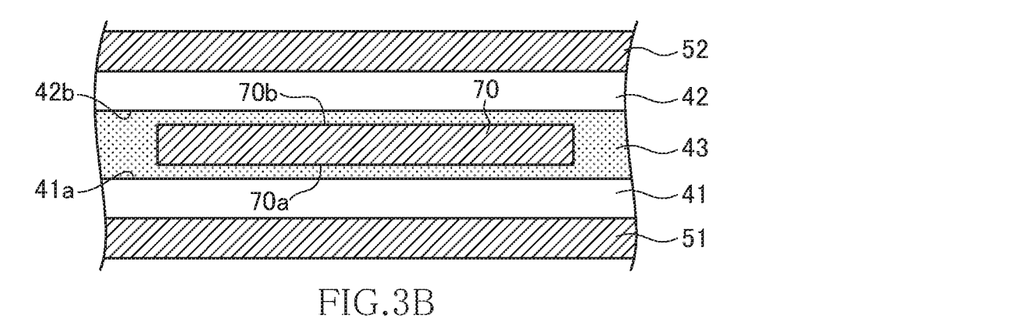
Figure 3C:
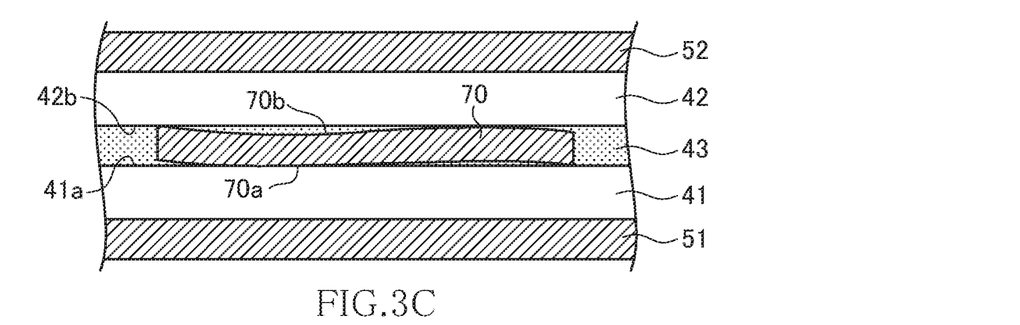
Figure 3D:
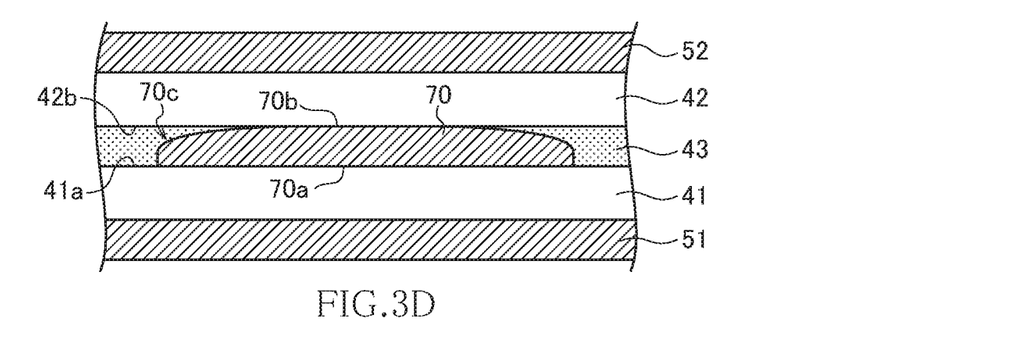

FIGS. 3A to 3D are partial cross-sectional views of the magnetic rotator 40. FIG. 3A illustrates an ideal state where unevenness or distortion is absent in the center conductor 70 and a case where the center conductor 70 and the ferrite cores 41 and 42 closely adhere to each other, FIG. 3B illustrates an ideal state where unevenness or distortion is absent in the center conductor 70 and a case where the dielectric 43 is interposed between the center conductor 70 and the ferrite cores 41 and 42, FIG. 3C illustrates a case where a distortion is present in the center conductor 70, and FIG. 3D illustrates a case where an edge part 70c of the center conductor 70 is smaller in thickness than the remaining part.

As illustrated in FIG. 3A, in an ideal state where unevenness or distortion is absent in the center conductor 70, a lower surface 70a of the center conductor 70 and an upper surface 41a of the ferrite core 41 can closely adhere to each other with substantially no gap, and an upper surface 70b of the center conductor 70 and a lower surface 42b of the ferrite core 42 can closely adhere to each other with substantially no gap. In this case, an air layer is not generated between the center conductor 70 and the ferrite cores 41 and 42, so that an effective dielectric constant is not reduced, with the result that electric characteristics almost as designed can be obtained. Further, even when the dielectric 43 is interposed between the lower surface 70a of the center conductor 70 and the upper surface 41a of the ferrite core 41, and the dielectric 43 is interposed between the upper surface 70b of the center conductor 70 and the lower surface 42b of the ferrite core 42 as illustrated in FIG. 3B, an air layer is not generated between the center conductor 70 and the ferrite cores 41 and 42, so that an effective dielectric constant is not reduced, with the result that electric characteristics almost as designed can be obtained.

On the other hand, when unevenness or distortion is present in the center conductor 70 as illustrated in FIG. 3C, a gap is generated between the lower surface 70a of the center conductor 70 and the upper surface 41a of the ferrite core 41, and a gap is generated between the upper surface 70b of the center conductor 70 and the lower surface 42b of the ferrite core 42. That is, the lower surface 70a of the center conductor 70 has a portion that contacts the upper surface 41a of the ferrite core 41 and a portion that does not contact the same, and a gap is generated at the portion that does not contact the upper surface 41a of the ferrite core 41. Similarly, the upper surface 70b of the center conductor 70 has a portion that contacts the lower surface 42b of the ferrite core 42 and a portion that does not contact the same, and a gap is generated at the portion that does not contact the lower surface 42b of the ferrite core 42. This may occur even when the center conductor 70 has an ideal shape and when unevenness or distortion is present in the surfaces of the ferrite cores 41 and 42. Further, as illustrated in FIG. 3D, even when the edge part 70c of the center conductor 70 is smaller in thickness than the remaining part, a gap is generated between the edge part 70c of the center conductor 70 and the lower surface 42b of the ferrite core 42. That is, the upper surface 70b of the center conductor 70 contacts the lower surface 42b of the ferrite core 42 at a portion having a large conductor thickness, while it does not contact the same at a portion having a small conductor thickness to generate a gap.

Even in the above cases, according to the present embodiment, the dielectric 43 is filled between the ferrite core 41 and the ferrite core 42, so that the above gap is filled up with the dielectric 43. Further, when a material having substantially the same dielectric constant as the ferrite cores 41 and 42 is selected as the material for the dielectric 43, almost the same state as the ideal state illustrated in FIG. 3A or FIG. 3B is obtained. Thus, even when a distortion or a film thickness distribution is present in the center conductor 70, electric characteristics almost as designed can be obtained.

However, the dielectric constant of the dielectric 43 and those of the ferrite cores 41 and 42 need not completely be equal to each other. That is, the dielectric constant of the dielectric 43 may be lower or higher than those of the ferrite cores 41 and 42. This is because, even when the dielectric constant of the dielectric 43 is lower than those of the ferrite cores 41 and 42, a reduction in effective dielectric constant can be suppressed as compared to a case where the air layer is present between the center conductor 70 and the ferrite cores 41 and 42. In this case, to obtain a sufficient effect, the dielectric constant of the dielectric 43 is preferably 0.5 times or more those of the ferrite cores 41 and 42. Further, considering a possibility that the air layer locally remains or a possibility that the distance between the center conductor 70 and the grounding conductors 51 and 52 is slightly increased due to interposition of the dielectric 43, the dielectric constant of the dielectric 43 is preferably equal to or higher than those of the ferrite cores 41 and 42.

Further, in the present embodiment, the dielectric 43 is filled also in a portion where the center conductor 70 does not exist in a plan view, whereby the side surfaces of the center conductor 70 are covered with the dielectric 43. As a result, substantially no air layer is present between the grounding conductors 51 and 52.

As described above, in the nonreciprocal circuit element 10 according to the present embodiment, the dielectric 43 is filled between the ferrite cores 41 and 42, so that even when the center conductor 70 and the ferrite cores 41 and 42 do not closely adhere to each other, the gap therebetween is filled up with the dielectric 43. Thus, even when unevenness or distortion is present in the center conductor 70 or ferrite cores 41 and 42, it is possible to prevent a change in electric characteristics attributable to the presence of the air layer caused due to the unevenness or distortion.

Figure 4:
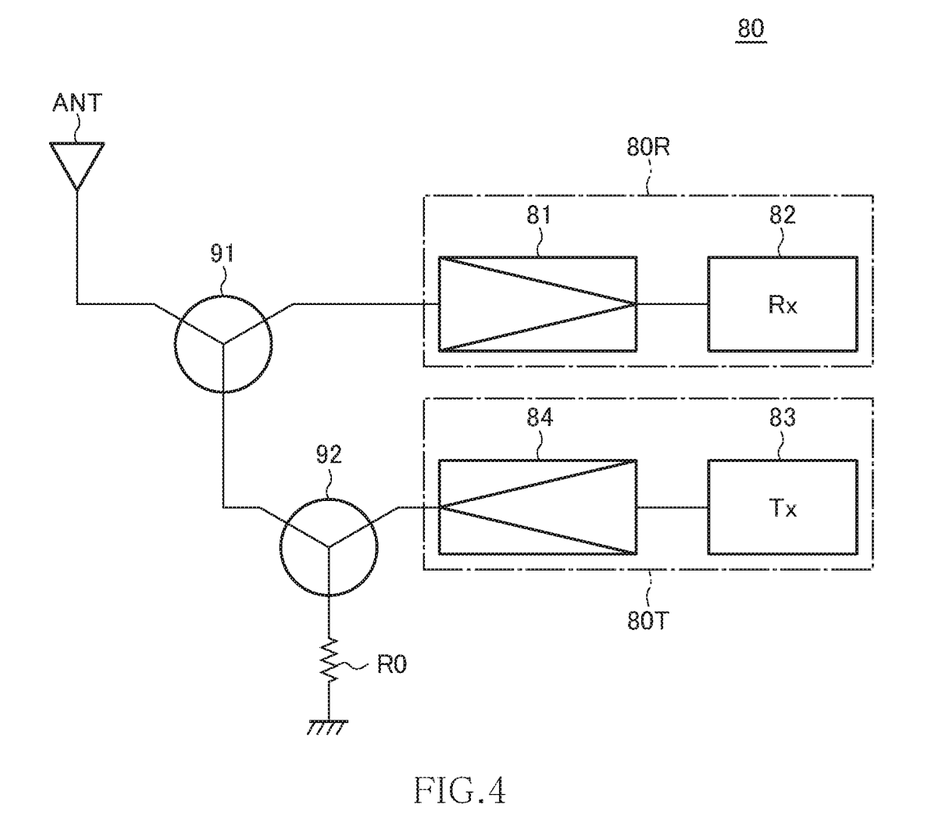
FIG. 4 is a block diagram illustrating the configuration of a communication apparatus using the nonreciprocal circuit element according to a preferred embodiment of the present invention.

FIG. 4 is a block diagram illustrating the configuration of a communication apparatus 80 using the nonreciprocal circuit element according to the present embodiment.

The communication apparatus 80 illustrated in FIG. 4 is provided in a base station in, e.g., a mobile communication system. The communication apparatus 80 includes a receiving circuit part 80R and a transmitting circuit part 80T, which are connected to a transmitting/receiving antenna ANT. The receiving circuit part 80R includes a receiving amplifier circuit 81 and a receiving circuit 82 for processing received signals. The transmitting circuit part 80T includes a transmitting circuit 83 for generating audio signals and video signals and a power amplifier circuit 84.

In the thus configured communication apparatus 80, nonreciprocal circuit elements 91 and 92 according to the present embodiment are used in a path from the antenna ANT to the receiving circuit part 80R and a path from the transmitting circuit part 80T to the antenna ANT, respectively. The nonreciprocal circuit element 91 functions as a circulator, and the nonreciprocal circuit element 92 functions as an isolator having a terminal resistor RO.

It is apparent that the present invention is not limited to the above embodiments, but may be modified and changed without departing from the scope and spirit of the invention.

Figure 5:
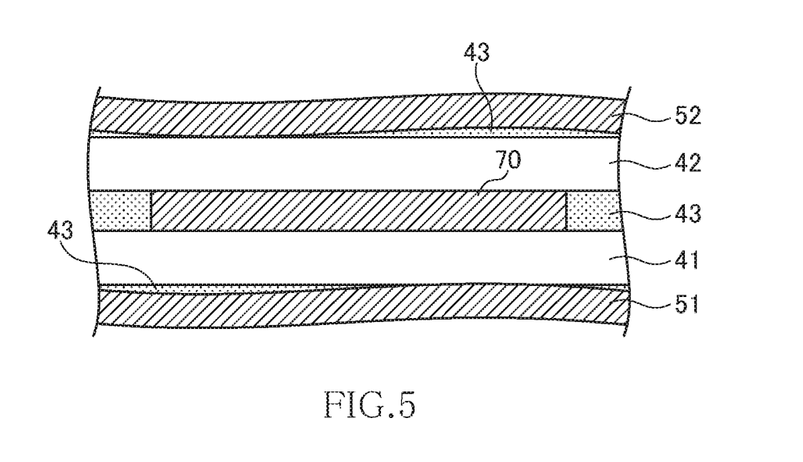
FIG. 5 is a partial cross-sectional view of a nonreciprocal circuit element according to a modification.

For example, in the above embodiment, the dielectric 43 is interposed between the ferrite cores 41 and 42; however, when the grounding conductors 51 and 52 are not printed on the ferrite cores 41 and 42, respectively, but provided in the form of a metal plate, or when they are printed on the permanent magnets 31 and 32, respectively, a gap may be generated between the ferrite core 41 and the grounding conductor 51 or between the ferrite core 42 and the grounding conductor 52, so that, in this case, as illustrated in FIG. 5, the dielectric 43 may be filled in a gap formed between the ferrite core 41 and the grounding conductor 51 and a gap between the ferrite core 42 and the grounding conductor 52.

Further, in the above embodiment, the distributed-constant-type nonreciprocal circuit element is taken as an example; however, the present invention may be applied also to a lumped-constant-type nonreciprocal circuit element.

Further, the magnetic rotator 40 used in the above embodiment has a structure in which the center conductor 70 is sandwiched between the two ferrite cores 41 and 42; however, either a pair of the ferrite core 41 and grounding conductor 51 or a pair of the ferrite core 42 and grounding conductor 52 may be omitted.

EXAMPLES

Irreversible circuit element samples A to C having the same structure of the nonreciprocal circuit element illustrated in FIG. 1 were assumed, and electric characteristics thereof were evaluated by simulations.

Figure 6A:
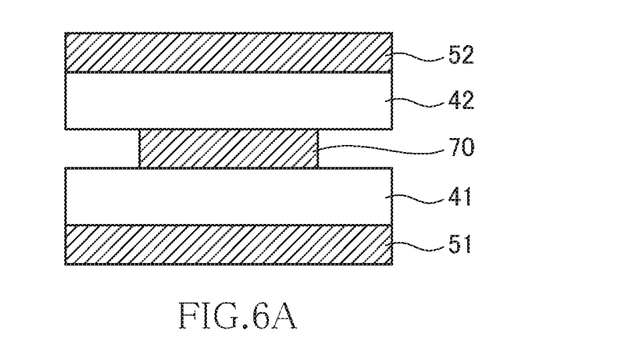
FIGS. 6A to 6C are cross-sectional views of the center conductors according to samples A to C of the example, respectively.
Figure 6B:
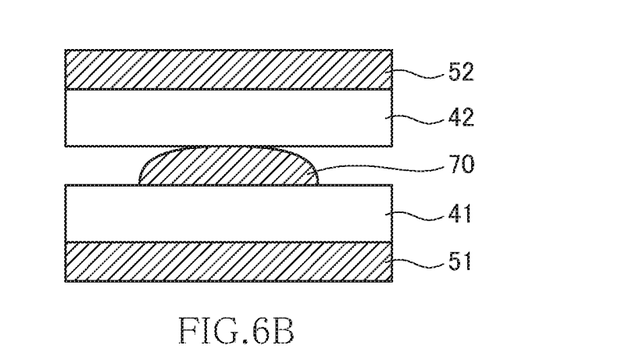
Figure 6C:
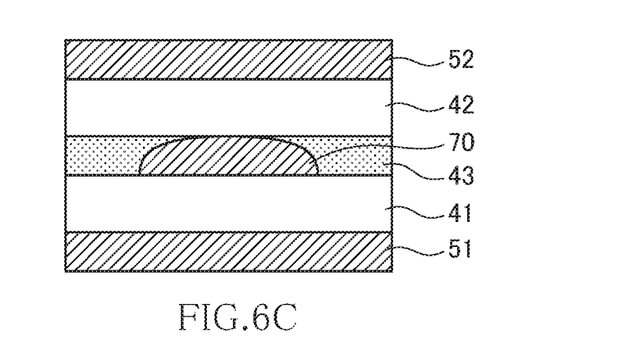

The sample A of FIG. 6A is a sample wherein an ideal state where an unevenness or distortion is absent in the center conductor 70 and where the conductor thickness is completely constant is assumed. The sample B of FIG. 6B is a sample wherein the conductor thickness of the center conductor 70 becomes thinner toward the edge part 70c. The sample C of FIG. 6C is a sample wherein the shape of the center conductor 70 is the same as that in the sample B, and the dielectric 43 is filled between the ferrite cores 41 and 42. The dielectric constant and dielectric loss tangent (tan δ) of the dielectric 43 are the same as those of the ferrite cores 41 and 42.

Figure 7A:
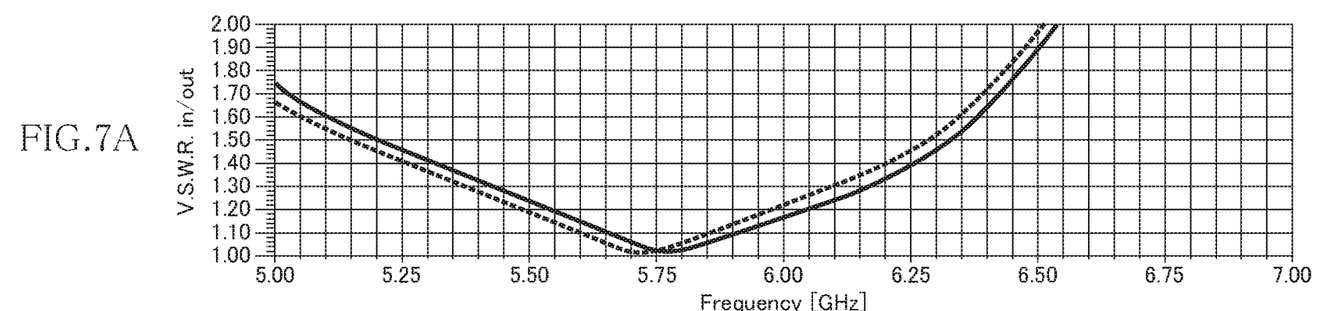
FIGS. 7A to 7C are graphs indicating resonance frequencies of samples A to C, respectively.
Figure 7B:
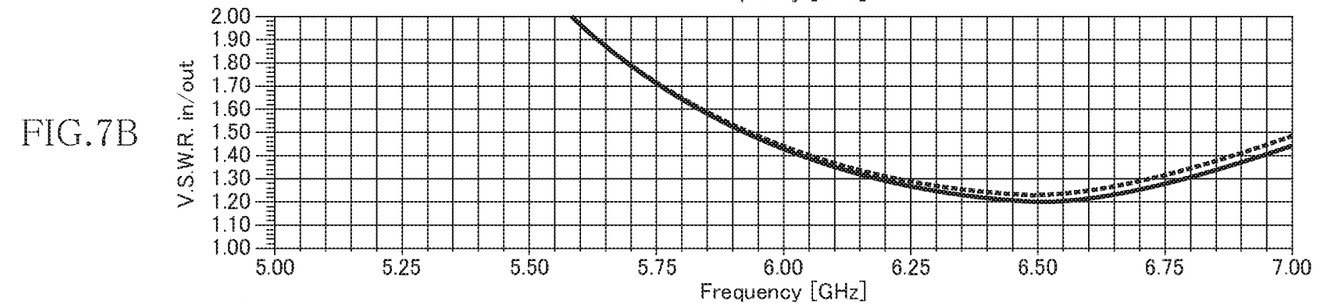
Figure 7C:
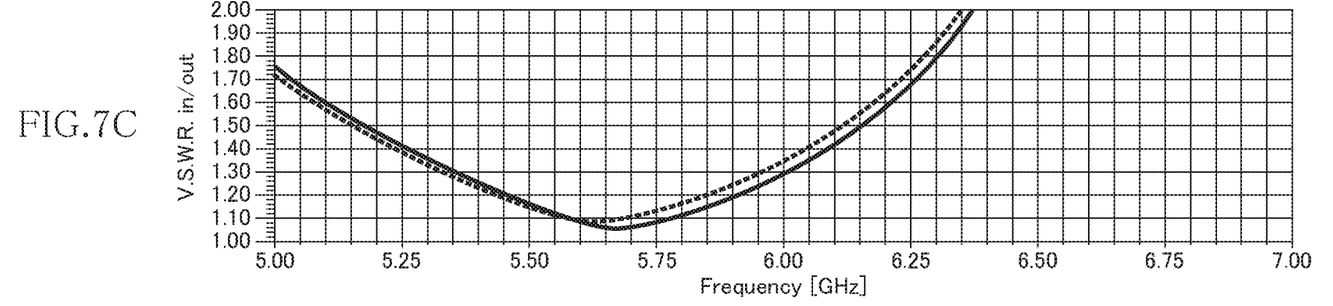

Simulation results are illustrated in FIGS. 7A to 7C. FIGS. 7A to 7C correspond respectively to the simulation results of the samples A to C. Two characteristic curves in each of FIGS. 7A to 7C denote an input VSWR and an output VSWR, and the average value of the peaks of the input and output VSWRs is defined as the resonance frequency. As illustrated in FIG. 7A, the resonance frequency obtained when the center conductor 70 has an ideal shape is about 5.75 GHz, while, as illustrated in FIG. 7B, the resonance frequency obtained when a film thickness distribution is present in the center conductor 70 is increased to about 6.60 GHz. This means that in order for the sample B to obtain a resonance frequency equivalent to that of the sample A, it is necessary to increase the size of the center conductor 70.

On the other hand, as illustrated in FIG. 7C, when the dielectric 43 is filled between the ferrite cores 41 and 42, the resonance frequency is about 5.65 GHz, which is substantially equivalent to the resonance frequency of the sample A obtained when the center conductor 70 has an ideal shape. That is, even when a film thickness distribution is present in the center conductor 70, it is possible to obtain a resonance frequency equivalent to that of the sample A without involving an increase in the size of the center conductor 70 by filing a gap generated due to the presence of the film thickness distribution with the dielectric 43.

Next, in the sample C illustrated in FIG. 6C, a change in insertion loss due to a difference in the dielectric loss tangent (tan δ) of the dielectric 43 to be used was simulated.

Figure 8A:
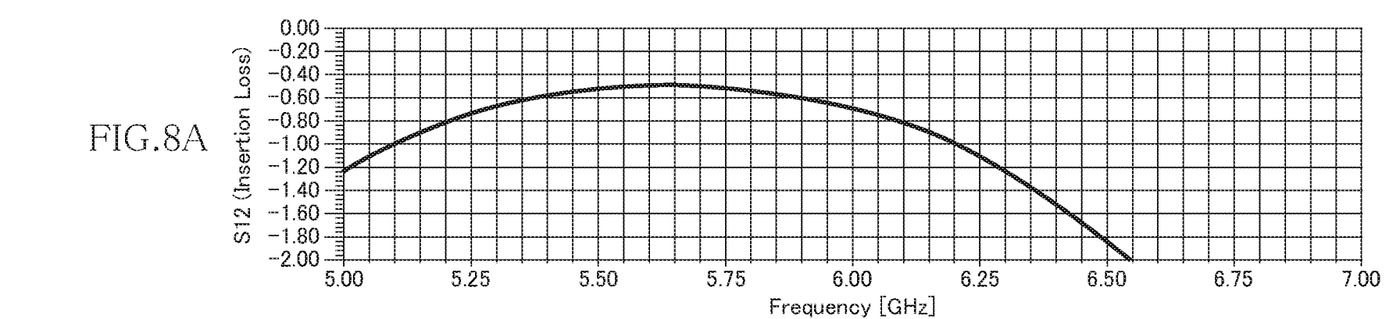
FIGS. 8A to 8C are graphs indicating simulation results where the dielectric loss tangent (tan δ) of the dielectric are 0.0008, 0.01, and 0.1, respectively.
Figure 8B:
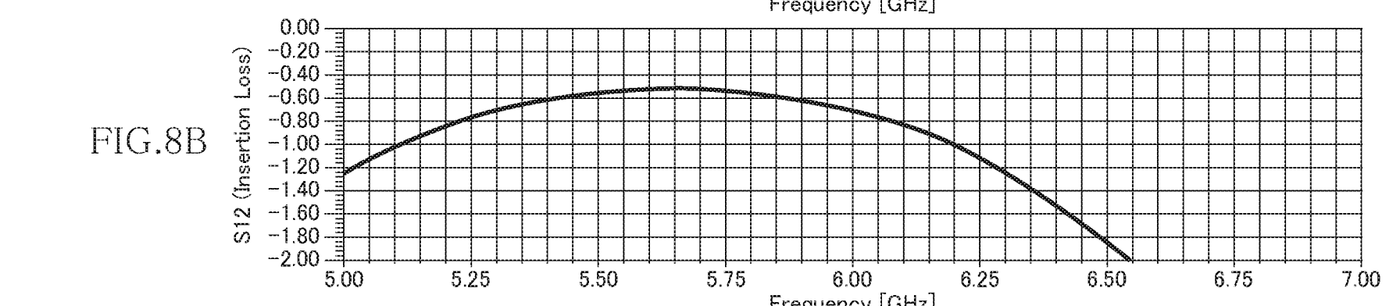
Figure 8C:
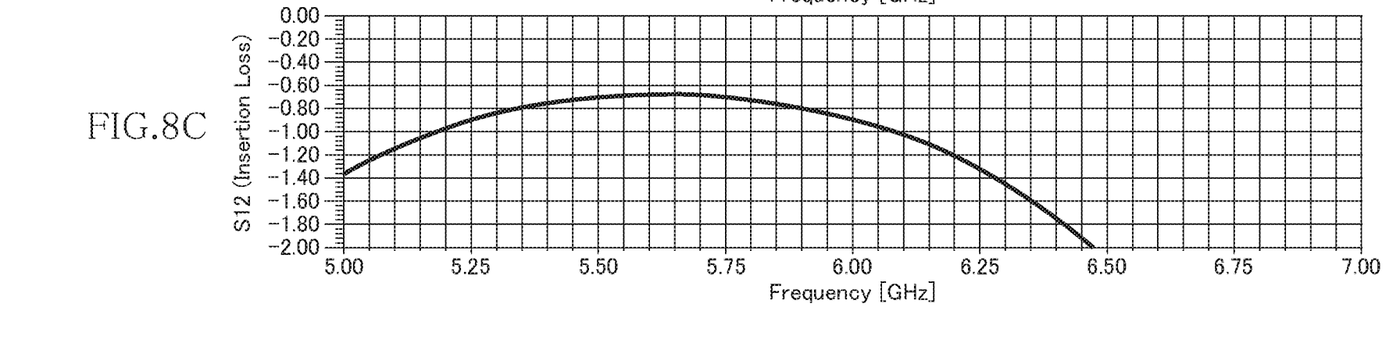

Simulation results are illustrated in FIGS. 8A to 8C. FIG. 8A illustrates an insertion loss obtained when the tan δ of the dielectric 43 is 0.0008 which is the same as that of YIG as the material for the ferrite cores 41 and 42. FIG. 8B illustrates an insertion loss obtained when the tan δ of the dielectric 43 is 0.01. As illustrated in FIGS. 8A and 8B, an insertion loss when the tan δ of the dielectric 43 is 0.0008 is −0.503 dB, and an insertion loss when the tan δ of the dielectric 43 is 0.01 is −0.520 dB. That is, a remarkable difference does not exist between the cases of FIGS. 8A and 8B. On the other hand, as illustrated in FIG. 8C, an insertion loss when the tan δ of the dielectric 43 is 0.1 is significantly deteriorated to −0.689 dB.

Figure 9:
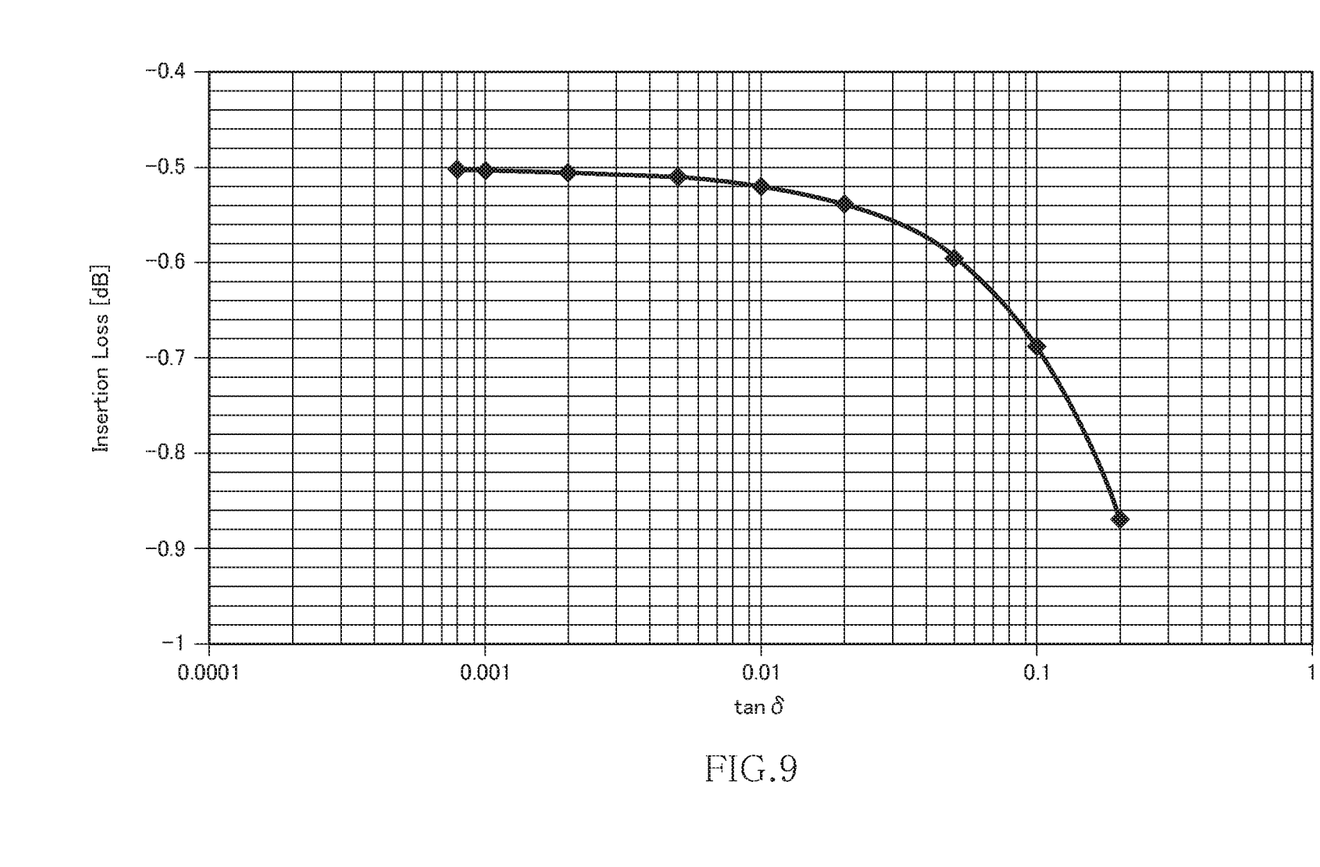
FIG. 9 is a graph illustrating the relationship between the dielectric loss tangent (tan δ) of the dielectric and insertion loss.

FIG. 9 is a graph illustrating the relationship between the dielectric loss tangent (tan δ) of the dielectric 43 and insertion loss. As illustrated in FIG. 9, the larger the tan δ of the dielectric 43 is, the larger the insertion loss becomes; however, the insertion loss only slightly changes in a region where the tan δ is equal to or less than 0.01, while when the tan δ exceeds 0.01, the insertion loss significantly deteriorates. Considering this, a material having a tan δ equal to or less than 0.01 is preferably selected as the material for the dielectric 43.

What is claimed is:

1. A nonreciprocal circuit element comprising:
    a magnetic rotator; and
    a permanent magnet that applies a DC magnetic field to the magnetic rotator,
    wherein the magnetic rotator includes a center conductor, a first ferrite core laminated on the center conductor, and a dielectric provided in a gap formed between the center conductor and the first ferrite core, and
    wherein a dielectric constant of the dielectric is equal to or higher than a dielectric constant of the first ferrite core.

2. The nonreciprocal circuit element as claimed in claim 1, wherein the dielectric covers a side surface of the center conductor.

3. The nonreciprocal circuit element as claimed in claim 1, further comprising a grounding conductor which is disposed on a back surface of the first ferrite core positioned on a side opposite to a front surface of the first ferrite core on which the center conductor is disposed,
    wherein the dielectric is further provided in a gap formed between the first ferrite core and the grounding conductor.

4. The nonreciprocal circuit element as claimed in claim 1, wherein a dielectric loss tangent (tan δ) of the dielectric is equal to or smaller than 0.01.

5. The nonreciprocal circuit element as claimed in claim 1,
    wherein the magnetic rotator further includes a second ferrite core,
    wherein the center conductor is sandwiched between the first and second ferrite cores, and
    wherein the dielectric is further provided in a gap formed between the center conductor and the second ferrite core such that the center conductor and the dielectric are sandwiched between the first and second ferrite cores.

6. The nonreciprocal circuit element as claimed in claim 5, wherein a lower surface or a upper surface of the center conductor is entirely covered with the dielectric without contacting the first or second ferrite core.

7. A nonreciprocal circuit element comprising:
    a magnetic rotator; and
    a permanent magnet that applies a DC magnetic field to the magnetic rotator,
    wherein the magnetic rotator includes a center conductor, a first ferrite core laminated on the center conductor, and a dielectric provided in a gap formed between the center conductor and the first ferrite core,
    wherein the magnetic rotator further includes a second ferrite core,
    wherein the center conductor is sandwiched between the first and second ferrite cores,
    wherein the dielectric is further provided in a gap formed between the center conductor and the second ferrite core such that the center conductor and the dielectric are sandwiched between the first and second ferrite cores,
    wherein a lower surface of the center conductor has a portion that contacts the first ferrite core and a portion that does not contact the first ferrite core,
    wherein an upper surface of the center conductor has a portion that contacts the second ferrite core and a portion that does not contact the second ferrite core, and
    wherein the dielectric is interposed between the portion of the lower surface of the center conductor that does not contact the first ferrite core and the first ferrite core and between the portion of the upper surface of the center conductor that does not contact the second ferrite core and the second ferrite core.

8. The nonreciprocal circuit element as claimed in claim 7, wherein the dielectric covers a side surface of the center conductor.

9. The nonreciprocal circuit element as claimed in claim 7, further comprising a grounding conductor which is disposed on a back surface of the first ferrite core positioned on a side opposite to a front surface of the first ferrite core on which the center conductor is disposed,
    wherein the dielectric is further provided in a gap formed between the first ferrite core and the grounding conductor.

10. The nonreciprocal circuit element as claimed in claim 7, wherein a dielectric loss tangent (tan δ) of the dielectric is equal to or smaller than 0.01.

11. A nonreciprocal circuit element comprising:
    a magnetic rotator; and
    a permanent magnet that applies a DC magnetic field to the magnetic rotator,
    wherein the magnetic rotator includes a center conductor, a first ferrite core laminated on the center conductor, and a dielectric provided in a gap formed between the center conductor and the first ferrite core,
    wherein the magnetic rotator further includes a second ferrite core,
    wherein the center conductor is sandwiched between the first and second ferrite cores,
    wherein the dielectric is further provided in a gap formed between the center conductor and the second ferrite core such that the center conductor and the dielectric are sandwiched between the first and second ferrite cores,
    wherein the center conductor has a large thickness portion and a small thickness portion,
    wherein the large thickness portion contacts the second ferrite core, and
    wherein the dielectric is interposed between the small thickness portion and the second ferrite core.

12. The nonreciprocal circuit element as claimed in claim 11, wherein the dielectric covers a side surface of the center conductor.

13. The nonreciprocal circuit element as claimed in claim 11, further comprising a grounding conductor which is disposed on a back surface of the first ferrite core positioned on a side opposite to a front surface of the first ferrite core on which the center conductor is disposed,
    wherein the dielectric is further provided in a gap formed between the first ferrite core and the grounding conductor.

14. The nonreciprocal circuit element as claimed in claim 11, wherein a dielectric loss tangent (tan δ) of the dielectric is equal to or smaller than 0.01.

\* \* \* \* \*